United States Patent
Kim et al.

(10) Patent No.: US 7,843,583 B2
(45) Date of Patent: Nov. 30, 2010

(54) ELECTRONIC ALBUM IMAGE FORMING APPARATUS

(75) Inventors: Yong-geun Kim, Suwon-si (KR); Min-seon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1237 days.

(21) Appl. No.: 11/370,807

(22) Filed: Mar. 9, 2006

(65) Prior Publication Data

US 2007/0024918 A1    Feb. 1, 2007

(30) Foreign Application Priority Data

Jul. 26, 2005   (KR) ............... 10-2005-0068072

(51) Int. Cl.
G06F 3/12 (2006.01)
H04N 1/04 (2006.01)

(52) U.S. Cl. ............... 358/1.15; 358/496; 358/498

(58) Field of Classification Search ............... 358/1.15, 358/1.18, 501, 505, 514, 400, 401, 474, 496, 358/498, 497; 399/16, 17, 316, 363, 365, 399/379, 388; 271/3.01, 3.13, 3.17, 8.1
See application file for complete search history.

(56) References Cited

U.S. PATENT DOCUMENTS

| | | | | |
|---|---|---|---|---|
| 5,173,785 A * | 12/1992 | Muramatsu | ............... | 358/400 |
| 7,120,910 B2 * | 10/2006 | Matsuda et al. | ............... | 718/102 |
| 7,133,150 B2 * | 11/2006 | Ishikawa | ............... | 358/1.16 |
| 7,233,403 B2 * | 6/2007 | Nakagiri et al. | ............... | 358/1.1 |
| 7,259,886 B2 * | 8/2007 | Iwase et al. | ............... | 358/1.15 |
| 7,464,335 B2 * | 12/2008 | Nakagiri et al. | ............... | 715/700 |

FOREIGN PATENT DOCUMENTS

| | | |
|---|---|---|
| CN | 1090356 | 9/2002 |
| JP | 2002-027229 | 1/2002 |
| JP | 2004-015175 | 1/2004 |
| KR | 2003-066735 | 8/2003 |
| KR | 2003-077005 | 9/2003 |

* cited by examiner

Primary Examiner—Jerome Grant, II
(74) Attorney, Agent, or Firm—Roylance, Abrams, Berdo & Goodman, L.L.P.

(57) ABSTRACT

Provided is an electronic album image forming apparatus having a scanner function, which includes an electronic album unit for displaying, selecting and editing a digital image; a print unit for printing a digital image selected in the electronic album unit; and a scan unit for scanning an original document and converting it into a digital image.

15 Claims, 3 Drawing Sheets

ELECTRONIC ALBUM IMAGE FORMING APPARATUS

CROSS-REFERENCE TO RELATED APPLICATION

This application claims the benefit under 35 U.S.C. §119 (a) of Korean Patent Applcation No. 2005-68072, filed Jul. 26, 2005, in the Korean Intellectual Property Office, the entire disclosure of which is hereby incorporated by reference.

BACKGROUND OF THE INVENTION

1. Field of the Invention

The present invention relates to an image forming apparatus. More particularly, the present invention relates to an electronic album image forming apparatus having a scanner function.

2. Description of the Related Art

As the use of digital cameras and camera phones has expanded, there has been an increase in the demand for printing digital images at a user's home. To meet this demand, photo printers enabling the printing of digital images have been marketed.

However, a conventional photo printer requires being connected to a computer in order to print the digital images as photographed. That is, if the digital images photographed by the digital camera are transferred to the computer and a specific image among the transferred images is selected by using software installed in the computer, the photo printer prints the selected digital image onto a printing medium. However, having to always use a computer with a conventional photo printer is inconvenient to a user.

To solve the aforementioned problem, there has been developed a photo printer that enables the printing of digital images by directly connecting the printer to a digital camera.

However, this photo printer also has a problem in that it has no functions for a user to edit the digital image while viewing it and then print the edited image.

Moreover, conventional photo printers are not able to convert a printed picture into a digital image. Thus, it is inconvenient to a user that a scanner needs to be connected to the computer in order to convert the printed picture into the digital image.

Accordingly, there is a need for an improved image forming apparatus that doesn't require being connected to either a computer or a scanner.

SUMMARY OF THE INVENTION

Exemplary embodiments of the present invention address at least the above problems and/or disadvantages and provide at least the advantages described below. Accordingly, an object of the present invention is to provide an electronic album image forming apparatus having an electronic album function for storing a digital image and editing the stored digital image, a scanner function for scanning an original document and converting it into a digital image, and a printer function for printing a selected digital image.

The above object of the present invention is substantially realized by providing an electronic album image forming apparatus comprising an electronic album unit for displaying selecting and editing a digital image; a print unit for printing a digital image selected in the electronic album unit; and a scan unit for scanning an original document and converting it into a digital image, in accordance with exemplary embodiments of the present invention.

The scan unit is structured to move the original document when scanning it. Preferably, the scan unit may be structured such that a scan path for moving the original document when scanning is the same as an eject path for ejecting the original document after scanning.

Further, the scan unit comprises a scan frame forming an original document transfer path; a plurality of rollers, disposed in the original document transfer path, for moving the original document; a guide portion, disposed in the original document transfer path, for supporting the original document by the plurality of rollers; and a scan sensor for scanning the original document moving in the original document transfer path.

Preferably, the scan unit may further comprise a plurality of original document-sensing sensors, disposed in the original document transfer path, for sensing the original document.

The electronic album unit comprises a display portion for displaying the digital image; a keypad portion including a plurality of keys for editing the digital image displayed on the display portion; a memory for storing a plurality of digital images; and an album control portion for displaying any of the plurality of digital images stored in the memory by the display portion and editing any of the plurality of digital images according to signals from the keypad portion.

Preferably, the electronic album unit may further comprise a memory slot into which a memory card can be inserted; and an interface portion for communicating data with an external device.

In accordance with another aspect of the present invention, the above object of the present invention is realized by providing an electronic album image forming apparatus comprising an electronic album unit for displaying, selecting and editing a digital image; a scan unit, disposed at a lower side of the electronic album unit, for scanning an original document and converting it into a digital image; and a print unit, disposed at a lower side of the scan unit, for printing a digital image selected in the electronic album unit, in accordance with exemplary embodiments of the present invention.

Preferably, the scan unit may be structured for scanning the original document by moving it and, after completing the scanning, for ejecting the original document by reversing the direction of movement of the original document.

In accordance with the electronic album image forming apparatus of the present invention, the electronic album unit makes it possible to edit the digital image photographed by digital mobile equipment, such as a digital camera or a camera phone, in an enlarged state while viewing the digital image, and to store the edited digital image, and the print unit makes it possible to directly print the digital image.

The scan unit also makes it possible to convert a printed picture into the digital image to be stored. Further, the electronic album unit makes it possible to edit the digital image and the print unit makes it possible to reprint the digital image.

In accordance with the electronic album image forming apparatus of the present invention, it is possible to store, print and scan the digital image, by using a single apparatus, without separate computer, printer and scanner.

The size of the scan unit of the electronic album image forming apparatus according to an exemplary embodiment of the present invention can be minimized since the original document moving during the scanning is fed and ejected through the same path. Consequently, a size of the electronic album image forming apparatus is minimized so as to improve portability of the apparatus.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
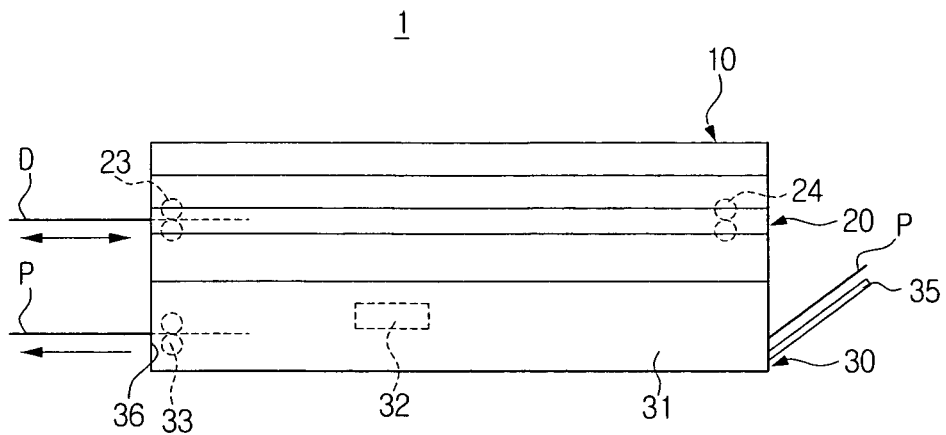
FIG. 1 schematically shows an electronic album image forming apparatus according to an exemplary embodiment of the present invention.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. An exemplary embodiment of an electronic album image forming apparatus according to the present invention is described with reference to the included drawings below.

With reference to FIGS. 1 to 4, an electronic album image forming apparatus 1 according to an exemplary embodiment of the present invention comprises an electronic album unit 10, a scan unit 20, a print unit 30 and a control portion 40.

The electronic album unit 10, which stores one or more digital images and outputs the stored digital images to a display portion 12 for editing, is preferably sized so as to be portable. The electronic album unit 10 comprises an album frame 11, a display portion 12, a memory 17, a memory slot 15, an interface portion 16, and a keypad portion 13.

Figure 2:
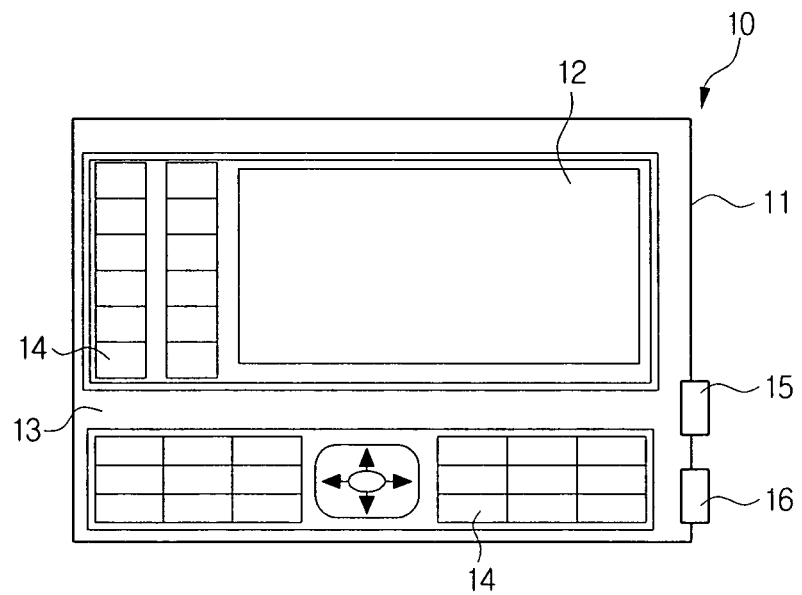
FIG. 2 is a plane view schematically showing an electronic album unit of the electronic album image forming apparatus of FIG. 1.

The display portion 12 for displaying the digital image is disposed on an upper surface of the album frame 11, as shown in FIG. 2. Of course, display portion 12 may be disposed at any other area of the album frame 11. Generally, a liquid crystal display (LCD) is used as the display portion 12. However, any other type of display that is capable of displaying digital images may alternatively be used.

The keypad portion 13 is disposed adjacent to the display portion 12 on the upper surface of the album frame 11, as shown in FIG. 2. Of course, keypad portion 13 may be disposed on any other area of the album frame 11. The keypad portion 13 comprises a plurality of keys 14 for editing digital images displayed on the display portion 12 or for searching/selecting a digital image file. A function, quantity and position of the plurality of keys disposed in the keypad portion 13 are determined according to the functions to be performed by the electronic album unit 10.

The memory 17 is disposed in the inside of the album frame 11 and stores data such as digital image data and other data. The memory 17 may be a removable memory. The memory 17 may store data received from an external device through the interface portion 16 which will be described later. The memory 17 also stores edited digital image edited using the display portion 12 and the keypad portion 13.

A memory slot 15 may be provided on one side of the album frame 11 so that a memory card can be inserted. The memory card, when inserted, may function as the memory 17 or may be used in addition to memory 17. The memory slot 15 is disposed at one side of the album frame 11, as shown in FIG. 2. Of course, memory slot 15 may be disposed on any other area of the album frame 11. The memory card inserted into memory slot 15 may be used in digital mobile equipments such as a digital camera or a camera phone. The memory card may be selectively inserted into and taken out of memory slot 15. Preferably, the memory slot 15 may include a plurality of slots, wherein memory cards of various kinds can be inserted. Exemplary memory cards include an MMC, an SD card, and a memory stick. However, any other type of removable memory may be used in addition to any type of wired or wireless communications device that uses a memory card interface. The memory slot 15 retains the memory card when inserted and electrically connects the memory card with the album control portion 41. Consequently, the album control portion 41 can display the digital image stored in the memory card on the display portion 12 and store the digital image edited by the display portion 12 in the memory card. Since the specific technical structure of the memory slot 15 is similar to the technical structure of a conventional memory slot, it will not be hereby described in the detailed description nor illustrated in the drawings.

The interface portion 16 may be provided on one side of the album frame 11, as shown in FIG. 2. Of course, interface portion 16 may be disposed on any other area of the album frame 11. The interface portion 16 may be used for communicating data, such as the digital image, with the external device. Herein, exemplary external devices include devices such as the digital camera, camera phone, computer and so on, which are capable of forming, editing and storing the digital image. Although a serial port or parallel port can be used as the interface portion 16, preferably, a USB port may be used, which is commonly used as an interface of for digital mobile equipment such as a digital camera.

The album control portion 41 is disposed within the album frame 11 and receives image data from the memory 17 or the memory card mounted in the memory slot 15 and displays the image on the display portion 12. The album control portion 41 can control a number of digital images stored in the memory 17 to be automatically displayed. The album control portion 41 may include an image editing software for editing an image displayed on the display portion 12. This image editing software can be used for adding texts, labels and artistic effects to the digital image. The image editing software can improve the digital image by making a correction to remove an undesired portion from the image. Since the image editing software disposed in the album control portion 41 may use conventional image editing software, it will not be hereby described. The image editing software is controlled to edit the image by a user operating the plurality of keys 14 that form the keypad portion 13.

The scan unit 20 is used for scanning an original document D such as a printed picture and converts it into a digital image comprising a scan frame 21, a plurality of transfer rollers 23 and 24, a guide portion 25, a lighting device 26, a scan sensor 27, and a plurality of original document-sensing sensors 28 and 29.

The original document transfer path 22 where the original document D is transferred is provided in the inside of the scan frame 21. The original document transfer path 22 is connected to an opening portion 22a formed at one side of the scan frame 21. The original document transfer path 22 becomes a scan path for moving the original document D for scanning and an eject path for ejecting the original document D after the scanning is complete.

Figure 4:
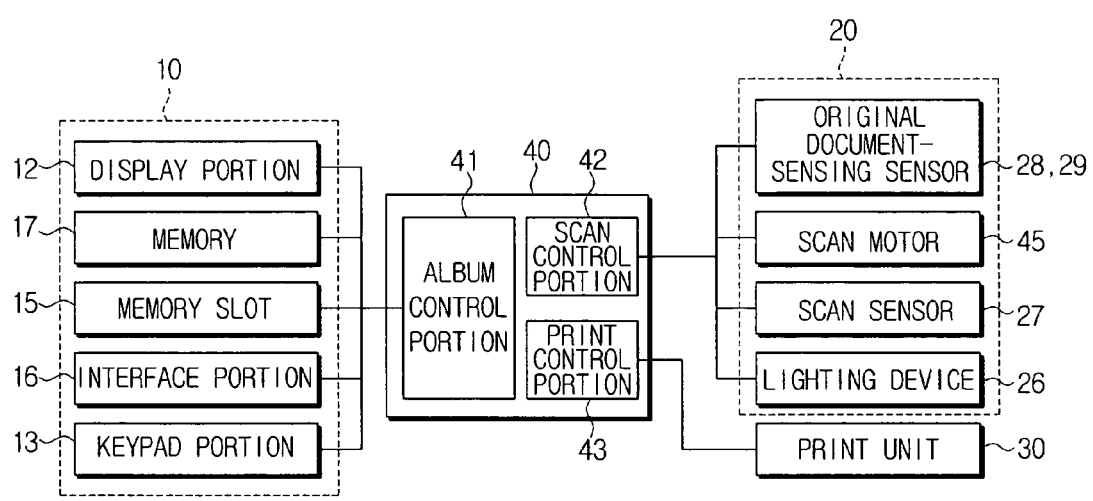
FIG. 4 is a block diagram showing functions of the electronic album image forming apparatus of FIG. 1.
Figure 5:
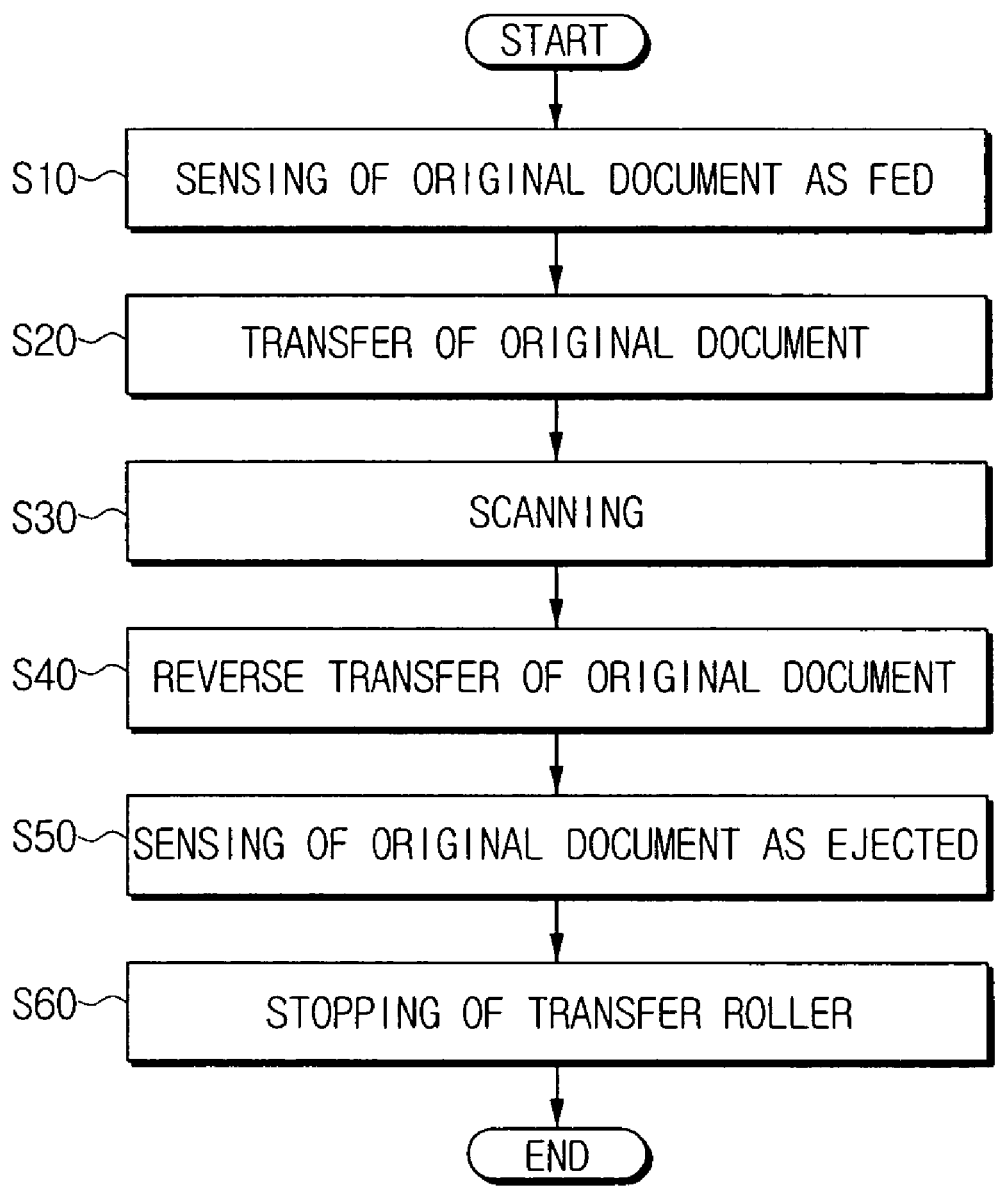
FIG. 5 is a flow chart showing a sequence of scanning an original document by the scan unit of the electronic album image forming apparatus of FIG. 1.

The plurality of transfer rollers 23 and 24 move the original document D such that the scan sensor 27 scans the original document D and comprises a first transfer roller 23 disposed in the original document transfer path 22 around the opening portion 22a, and a second transfer roller 24 disposed in the inside of the original document transfer path 22. Each of the first and second transfer rollers 23 and 24 consists of a pair of rollers which rotate in contact with each other, and rotates by power transferred from a scan motor 45 that is shown in FIG. 4. The scan motor 45 is rotatable and reversible. A power transfer device (not shown) for transferring the power of the scan motor 45 to the first and second transfer rollers 23 and 24 is provided between the scan motor 45 and the first and second transfer rollers 23 and 24.

The guide portion 25 is disposed between the first and second transfer rollers 23 and 24 in the original document transfer path 22 and supports the original document D being transferred.

The scan sensor 27 is disposed in the original document transfer path 22 in order to scan the original document D transferred through the original document transfer path 22. Preferably, the scan sensor 27 may be disposed between the first and the second transfer rollers 23 and 24. An image sensor, such as a charged couple device (CCD) or a CMOS Image Sensor (CIS), is used as the scan sensor 27. A lighting device 26 is disposed adjacent the scan sensor 27 and is illuminated during the scanning. An LED or any other light source may be used as the lighting device 26.

Figure 3:
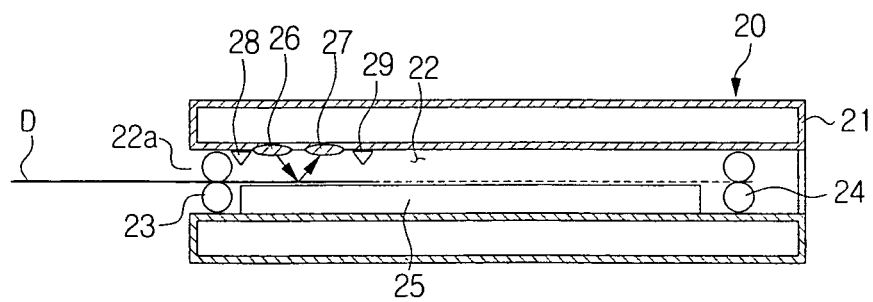
FIG. 3 is a sectional view schematically showing a scan unit of the electronic album image forming apparatus of FIG. 1.

The plurality of original document-sensing sensors 28 and 29 are disposed in the original document transfer path 22 and sense the original document D as transferred. The plurality of original document-sensing sensors 28 and 29 consist a first original document-sensing sensor 28 disposed between the first transfer roller 23 and the scan sensor 27, and a second original document-sensing sensor 29 disposed adjacent to the scan sensor 27 on a side opposite to the first original document-sensing sensor 28, as shown in FIG. 3. Preferably, the first original document-sensing sensor 28 may be disposed so as to be close to the first transfer roller 23, and the second original document-sensing sensor 29 may be disposed so as to be close to the scan sensor 27. The first original document-sensing sensor 28 senses the original document D fed through the first transfer roller 23 and sends a signal to the scan control portion 42. The second original document-sensing sensor 29 senses that the original document D passes through the scan sensor 27 and sends another signal to the scan control portion 42. While a photo sensor is preferred be used as the original document sensors 28 and 29, any sensor capable of sensing the original document D being transferred can be used.

The scan control portion 42 performs the scanning by receiving signals from the original document-sensing sensors 28 and 29 and controlling the first and second transfer rollers 23 and 24, the scan sensor 27 and the lighting device 26. The scan control portion 42 scans the original document D by using the scan sensor 27, forms the digital image, and then stores the digital image in the memory 17 of the electronic album unit 10.

The print unit 30 prints the digital image onto a printing medium P and comprises a print frame 31, an image-forming portion 32 for forming the image onto the printing medium P according to printing data, a medium transfer portion 33 for transferring the printing medium P, and a print control portion 43.

In the medium transfer portion 33, a paper feed tray 35 for feeding the printing medium P is provided at one side of the print frame 31, and a paper ejection opening 36 for ejecting the printing medium P as printed is provided at the opposite side of the paper feed tray 35. The image-forming portion 32 is provided at an upper side of the medium transfer portion inside the print frame 31. Since the image-forming portion 32, medium transfer portion 33 and print control portion 43 have the same structures and functions of a conventional photo printer, these will not be hereby described. The printing medium P is a glossy or matte paper suitable for printing photos. Preferably, for portability, the maximum size of the printing medium P that the medium transfer portion 33 is capable of transferring is the A5.

The control portion 40 controls the electronic album image forming apparatus 1 according to an exemplary embodiment of the present invention in order to perform the electronic album function, the scanner function and the printer function, and comprises an album control portion 41, a scan control portion 42 and a print control portion 43. As the album control portion 41, scan control portion 42 and print control portion 43 are already explained above, respectively, these will not be hereby repeatedly described.

The aforementioned electronic album unit 10, scan unit 20 and print unit 30 can be variously arranged in regards to the mutual relational position. However, preferably, the electronic album unit 10 may be arranged on the top, the scan unit 20 be arranged under the electronic album unit 10, and the print unit 30 be arranged as the lowest portion, as used in the exemplary embodiment of the present invention. Further, it is preferable that the opening portion 22a of the scan unit 20 and the paper ejection opening 36 of the print unit 30 be arranged on the same side.

Now, the operations of the electronic album image forming apparatus 1 according to an exemplary embodiment of the present invention will be described with reference to FIGS. 1 to 5.

First, an operation of scanning an original document D by the scan unit 20 will be described below.

When a user feeds the original document into the first transfer roller 23 through the opening portion 22a of the scan unit 20, the first original document-sensing sensor 28 disposed at the right of the first transfer roller 23 senses a front edge of the original document D (S10).

If the first original document-sensing sensor 28 senses the front edge of the original document D, it sends a signal to the scan control portion 42. Then, the scan control portion 42 drives the scan motor 45 to rotate the first transfer roller 23. When the first transfer roller 23 rotates, the original document D is transferred to the second transfer roller 24 along the guide portion 25 (S20).

After that, if the second original document-sensing sensor 24 senses the front edge of the original document D being transferred, it sends a signal to the scan control portion 42. Then, the scan control portion 42 scans the original document D by operating the lighting device 26 and the scan sensor 27 (S30). Herein, as the original document D is continuously transferred past the scan sensor 27 by the first transfer roller 23, the scan sensor 27 can scan the whole surface of the original document D.

If the original document D is continuously transferred and the first original document-sensing sensor 28 senses a rear edge of the original document D, the first original document-sensing sensor 28 sends a signal to the scan control portion 42. Then, the scan control portion 42 turns off the scan sensor 27 after a predetermined time. The predetermined time is determined passed on a distance between the first original document-sensing sensor 28 and the scan sensor 27. At this time, the scan control portion 42 stores the digital image that was scanned by the scan sensor 27 into the memory 17.

After that, if the second original document-sensing sensor 29 senses the rear edge of the original document D, it sends a signal to the scan control portion 42. At this time, the front part of the original document D is positioned at the second transfer roller 24. The scan control portion 42 receiving the signal from the second original document-sensing sensor 29 stops the scan motor 45 and again reverses it. Then, the first and second transfer rollers 23 and 24 are also reversed accordingly. If the first and second transfer rollers 23 and 24 operate in reverse, the original document D is transferred back inside the original document transfer path 22 to be transferred in reverse to the opening portion 22a along the guide portion 25 (S40). That is, the original document D is transferred in the opposite direction to the transfer direction upon scanning and is ejected out of the scan unit 20. At this time, the first and second original document-sensing sensors 28 and 29 sense that the original document D is ejected and send a signal to the scan control portion 42 (S50). Then, the scan control portion 42 senses/perceives that the original document D is ejected, and stops the rotation of the first and second transfer rollers 23 and 24 to end the scanning operation (S60).

Next, an operation of viewing or editing the digital image by the electronic album unit 10 will be described.

The user displays the digital image stored in the memory 17 on the display portion 12 and selects a specific digital image by using the keypad portion 13 of the electronic album unit 10. In other cases, it is possible to select a desired image by automatically cycling the digital image displayed on the display portion 12.

In case of editing the image, after the image to be edited is displayed on the display portion 12, the displayed image is edited using the image editing software installed in the album control portion 41. Since the editing of the image by the image editing software is a known technique, this will not be hereby described.

When the editing of the digital image is completed, the user stores the edited image into the memory 17. If the user wants to print the edited image, the user can print the edited image onto the printing medium P by using the print unit 30.

Finally, an operation of printing the digital image on the printing medium P by the print unit 30 will be described. After displaying the digital image to be printed onto the display portion 12 by using the electronic album unit 10, the user loads the printing medium P in the paper feed tray 35. Then, the user can print the displayed digital image by pressing a print key on the keypad portion 13. Since the process of printing the digital image onto the printing medium P by the print unit 30 is similar to the process of printing using a conventional photo printer, this will not be hereby described.

The user can edit, by enlargement, reduction, composition and so on, the digital image displayed on the display portion 12 in a desired mode, and print the edited digital image using the print unit 30.

In addition, the user can scan the printed picture using the scan unit 20 and directly print it using the print unit 30.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image forming apparatus connectable to a host computer, the image forming apparatus comprising:
    a print unit operable to print a digital image;
    a memory slot to removably receive a memory storing a plurality of digital images;
    an electronic album unit operable to (i) display a digital image selected from the plurality of digital images stored in the memory, (ii) edit the displayed digital image, and (iii) print the edited digital image using the print unit; and
    a scan unit operable to scan an original document and generate a digital image based thereon;
    wherein the scan unit is operable to scan the original document by using a scan sensor, maintained in a fixed relationship with respect to the document transfer path, to sense the original document as the original document is transferred through the document transfer path via a scan control portion driving a scan motor;
    wherein the electronic album unit is operable to display, select and edit digital images independently with respect to operations of the host computer.

2. The apparatus as claimed in claim 1, wherein:
    the scanned digital image generated by the scan unit is capable of being stored in the memory along with other plurality of digital images.

3. The apparatus as claimed in claim 2, wherein the scan unit includes a scan path for moving the original document when scanning and an eject path for ejecting the original document after completing the scanning, wherein the scan path and the eject path are the same.

4. The apparatus as claimed in claim 3, wherein the scan unit comprises:
    a scan frame forming an original document transfer path;
    a plurality of rollers, disposed in the original document transfer path, for moving the original document;
    a guide portion, disposed in the original document transfer path, for supporting the original document moved by the plurality of rollers; and
    a scan sensor for scanning the original document that is moved in the original document transfer path.

5. The apparatus as claimed in claim 4, wherein the scan unit further comprises a plurality of original document-sensing sensors, disposed in the original document transfer path, for sensing the original document.

6. The apparatus as claimed in claim 2, wherein:
    the electronic album unit is operable to select the scanned digital image generated by the scan unit and stored in the memory and to enable editing of the scanned digital image selected from the memory.

7. The apparatus as claimed in claim 1, wherein the electronic album unit comprises:
    a display portion for displaying the digital image;
    a keypad portion provided with a plurality of keys for editing the digital image displayed on the display portion; and
    an album control portion for displaying any of the plurality of digital images stored in the memory on the display portion and for editing any of the plurality of digital images according to a signal from the keypad portion.

8. The apparatus as claimed in claim 7, wherein the electronic album unit edits the digital image by enlarging or reducing the displayed digital image.

9. The apparatus as claimed in claim 1, wherein the electronic album unit, the print unit and a scan unit are integrally disposed and connected to form a stand-alone unit of the apparatus.

10. An electronic album image forming apparatus comprising:
   an electronic album unit for displaying, selecting and editing a digital image;
   a scan unit, disposed at a lower side of the electronic album unit, for scanning an original document and converting it into a digital image; and
   a print unit, disposed at a lower side of the scan unit, for printing a digital image selected and edited by the electronic album unit;
   wherein the scan unit is operable to scan the original document by using a scan sensor, maintained in a fixed relationship with respect to a document transfer path, to sense the original document as the original document is transferred through the document transfer path via a scan control portion driving a scan motor;
   wherein the electronic album unit, the print unit and the scan unit are integrally disposed and connected to form a stand-alone unit of the apparatus.

11. The apparatus as claimed in claim 10, wherein the scan unit moves the original document when scanning the original document in an original document transfer path, and after completing the scanning, the scan unit ejects the original document by reversing the direction of movement of the original document in the original document transfer path.

12. The apparatus as claimed in claim 11, further comprising:
   a scan frame forming the original document transfer path;
   a plurality of rollers, disposed in the original document transfer path, for moving the original document;
   a guide portion, disposed in the original document transfer path, for supporting the original document moved by the plurality of rollers; and
   a scan sensor for scanning the original document moved through the original document transfer path.

13. The apparatus as claimed in claim 12, wherein the scan unit further comprises a plurality of original document-sensing sensors, disposed in the original document transfer path, for sensing the original document.

14. The apparatus as claimed in claim 10, wherein the electronic album unit comprises:
   a display portion for displaying the digital image;
   a keypad portion provided with a plurality of keys for editing the digital image displayed on the display portion;
   a memory for storing a plurality of digital images; and
   an album control portion for displaying any of the plurality of digital images stored in the memory on the display portion and for editing the any of the plurality of digital images according to a signal from the keypad portion.

15. The apparatus as claimed in claim 14, wherein the electronic album unit further comprises:
   a memory slot into which a memory card is inserted; and
   an interface portion for communicating data with an external device.

* * * * *